UNITED STATES PATENT OFFICE.

GEORGE EDWIN PERKINS, OF ATKINSON, ILLINOIS, ASSIGNOR OF ONE-FOURTH TO EDWIN EVERETT AND ONE-FOURTH TO J. W. McCULLOUGH, BOTH OF ATKINSON, ILLINOIS.

SEALING COMPOSITION FOR RADIATORS.

1,393,961.        Specification of Letters Patent.        Patented Oct. 18, 1921.

No Drawing.    Application filed June 2, 1921. Serial No. 474,387.

*To all whom it may concern:*

Be it known that I, GEORGE E. PERKINS, a citizen of the United States, residing at Atkinson, in the county of Henry and State of Illinois, have invented certain new and useful Improvements in Sealing Composition for Radiators; and I do declare the following to be a full, clear, and exact description of the invention, such as will enable others skilled in the art to which it appertains to make and use the same.

My invention relates to a compound for sealing cracks or breaks that may arise in radiators, particularly of combustion gas engines of automobiles, although it may be used in other types of radiators or other chambers where it is desirable to close fractures or breaks that would result in leakage.

The object is to provide a composition which will float and be carried by the circulating fluid or agent into contact with the surface to be sealed without interfering with the free circulation of the conveying fluid, the insoluble or precipitable ingredients of the compound entering the crevices of the fractured member and coagulating so as to effectively close the crevices and prevent leakage.

The compound is formed of the following ingredients and substantially the proportions given, to wit: turpentine rosin, thirty three and one third per cent.; flax seed meal, sixty three and two thirds per cent.; lamp black, one per cent.; and guaiac resin, two per cent. The composition is prepared by first pulverizing the turpentine resin and the guaiac resin and then placing the two pulverized resins in a suitable mixing machine in which is placed the flax seed meal, the several ingredients being thoroughly mixed with one another; the lamp black is then added and all the ingredients thoroughly mixed, the mixing operation tending to bring the particles of oil in the flax seed meal to the surface of the particles and into contact with the particles of pulverized resins and lamp black. When this composition is put into the circulating fluid of the radiator the fluid carries the compound with it, the oil of the meal serving to float the particles of meal and resins and lamp black so that the composition will be carried by the circulating fluid into contact with all portions of the surfaces of the chamber exposed thereto and will enter any breaks or cracks in said surface and close the same. The heat of the circulating fluid melts the particles of resin and the same together with the meal and lamp black are carried by the fluid and the pressure within the radiator forces the composition into the breaks or cracks and closes the same against leakage. The lamp black penetrates the breaks to points that might not be reached by some particles of the meal and the resins melted by the heat cause the particles to adhere to the walls of the crevices and form a filling to effectively close the same. The guaiac resin is more soluble than the other ingredients and renders the turpentine resin more plastic than turpentine resin by itself and also renders the composition less brittle when cooled, so that there is produced a sealing composition that is elastic, penetrating, possessing strong adhesive qualities, and that is readily floatable or buoyant in the circulating fluid without undue precipitation in conveyance throughout the chamber in which the fluid circulates. The composition may also be effectively used without becoming brittle even when denatured alcohol is used in the circulating fluid to prevent freezing in the winter season.

I have given the proportions of the different ingredients which I have found to give the best results under varying conditions but changes can be made in the proportions and material benefits of the composition still be derived.

Having described my invention and set forth its merits what I claim is:

1. The composition for sealing crevices in radiators consisting of turpentine resin, guaiac resin, flax seed meal, and lamp black, the guaiac resin being in a smaller per cent. than the turpentine resin and flax seed meal.

2. The composition for sealing crevices in radiators containing turpentine resin, guaiac resin and flax seed meal, the flax seed meal being in a greater per cent. than the other ingredients and the guaiac resin in a smaller per cent. than the turpentine resin.

In testimony whereof I affix my signature in presence of two witnesses.

GEORGE EDWIN PERKINS.

Witnesses:
 NELLIE CASEY,
 FRANK HELLER.